United States Patent Office 2,752,391
Patented June 26, 1956

2,752,391

PREPARATION OF GLYCERIC ACID

Gerald Gilbert and William S. Johnson, Philadelphia, Pa., assignors to Rohm & Haas Company, Philadelphia, Pa., a corporation of Delaware No Drawing. Application December 4, 1952,
Serial No. 324,121

3 Claims. (Cl. 260—535)

This invention relates to the preparation of glyceric acid and its salts.

The process of this invention comprises oxidizing acrylic acid to glyceric acid by heating an aqueous reaction mixture of acrylic acid and sodium chlorate to a temperature from 30° to 80° C.—and preferably from 40° C. to 70° C.—in the presence of a catalytic amount of osmium tetroxide, and isolating the glyceric acid, thus formed, from the reaction mixture.

The reaction is believed to take the following course:

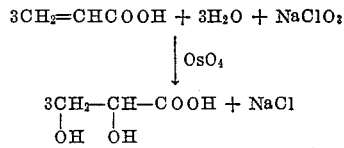

In the preferred embodiment of this invention an aqueous solution of acrylic acid is slowly added to an aqueous solution containing an excess, of the order of 10% to 200%, over the stoichiometric amount of sodium chlorate and from 0.01% to about 0.1%, but preferably 0.01% to 0.05%, osmium tetroxide while the reaction mixture is held at a temperature of about 30° C. to about 80° C., preferably about 40° C., to about 70° C. At the conclusion of the reaction, the aqueous solution is extracted with a solvent for osmium tetroxide—preferably benzene—in order to remove and recover the catalyst for further use.

The glyceric acid is next isolated. According to one procedure the aqueous solution is neutralized with an oxide, hydroxide, carbonate or bicarbonate of an alkaline earth metal, preferably calcium, and the alkaline earth glycerate is separated by crystallization, thus leaving in solution sodium chloride and an alkaline salt of polyacrylic acid, the latter being a by-product. The alkaline earth salt of glyceric acid is converted into glyceric acid by treatment with dilute sulfuric acid or into alkali metal glycerates by treatment in aqueous solution with an alkali metal salt, the anion of which forms a water-insoluble salt with the alkaline earth metal. The insoluble alkaline earth salt is then removed mechanically, as, for example, by filtration, from the solution of glyceric acid or soluble glycerate.

Another method for removing the glyceric acid from the reaction mixture comprises extracting the latter thoroughly with a water-insoluble ketone or aldehyde, such as cyclohexanone, benzaldehyde, ethyl benzyl ketone, 2-ethylhexaldehyde, ethyl butyl ketone, butyraldehyde, hexanal, methyl hexyl ketone or methyl heptyl ketone. The extraction is most conveniently carried out at room temperature and especially good results are obtained by the use of cyclohexanone. A ketal-type of compound is thus formed which is, however, unstable in the presence of water. Consequently, after the glyceric acid is removed by extraction from the aqueous reaction mixture, it is readily freed of the aldehyde or ketone by steam distillation. This method of isolating the glyceric acid is especially good because it separates the acid from any polyacrylic acid which may have formed as a by-product.

The yield of glyceric acid by the process of this invention is surprisingly high in view of the fact that calcium acrylate, for example, or ethyl acrylate polymerizes almost completely under the very conditions which are employed here to oxidize the acrylic acid.

In addition to the fact that high temperatures favor polymerization, they also cause decarboxylation with the liberation of carbon dioxide. It is, therefore, strongly recommended that the temperature be no higher than 80° C. during the reaction.

Glyceric acid is extremely prone to change to the dimer having the formula

This dimer, glyceroyl glycerate, forms particularly readily in the absence of water or from a solution of glyceric acid whether in water or in organic solvent when the solution is evaporated. Consequently, it is suggested that glyceric acid be produced and stored as an aqueous solution.

The following examples serve to illustrate the preferred embodiments of this invention.

*Example 1*

Into a 3-necked flask equipped with reflux condenser, stirrer, thermometer and dropping funnel was charged 432 parts of a 25% aqueous solution of sodium chlorate, which solution also contained 0.04% osmium tetroxide. The stirred solution was heated to 50° C. and two moles (144 parts) of freshly distilled acrylic acid was added to the solution at such a rate that the resultant exothermic reaction held the temperature between 50° C. and 70° C. The solution was further held between 50° C. and 70° C. for four additional hours, after which it was cooled and extracted with three 200-part portions of benzene in order to remove the osmium tetroxide. The aqueous solution was tested for osmium tetroxide by the thiourea method (Milas et al., Journal American Chemical Society, 47, page 1412 (1925)) to insure that all of the catalyst had been removed. The solution was neutralized with calcium hydroxide and then evaporated until sodium chloride began to crystallize. Enough water was added to redissolve the salt and the solution was then refrigerated overnight while calcium glycerate crystallized. The latter salt was removed by filtration and was washed with a saturated solution of sodium chloride in order to remove any occluded calcium polyacrylate, since the latter is soluble in such a sodium chloride solution. A 62% yield of calcium glycerate was thus obtained.

Essentially the same results were obtained when lime or calcium carbonate or calcium bicarbonate was used to neutralize the reaction mixture.

In 200 parts of water was suspended 190 parts (0.66 mole) of calcium glycerate prepared as above. Then 0.66 mole of sulfuric acid, as a 50% aqueous solution, was added and the mixture was stirred and warmed for 15 minutes. The mixture on cooling was filtered in order to remove the precipitated calcium sulfate and the filtrate was treated with a commercial cation-exchange resin in the hydrogen form in order to remove the final traces of calcium ion. The resultant solution contained glyceric acid as established by analysis and determination of saponification number. A portion of the product was stripped of water to yield a syrupy liquid which was reported heretofore to be glyceric acid but which is actually a mixture of the monomeric acid and its dimer. When the syrupy liquid was held at 105° C.–110° C. under reduced pressure for 80 hours, the material gradually polymerized to a solid resin which was insoluble in common solvents including acetone, water, ethylene dichloride, benzene, methanol and ethanol, and which decomposed at 210° C. without melting.

*Example 2*

The process of Example 1 above was followed through the step of removing the osmium tetroxide by extraction. The aqueous reaction mixture was then extracted three times with twice its volume of cyclohexanone. In this way glyceric acid was removed as a ketal, believed to have the formula

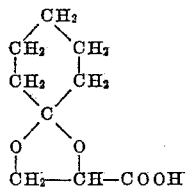

The cyclohexanone solution was then subjected to steam distillation, the intermediate ketal compound was decomposed, and the cyclohexanone was removed, leaving an aqueous solution of glyceric acid, as confirmed by analysis.

Monomeric glyceric acid is readily converted into esters, salts and nitro derivatives. The acid is also used in conjunction with iron and chrome tanning agents in order to stabilize the water-resistance of leather.

We claim:

1. A process for preparing glyceric acid which comprises reacting acrylic acid and sodium chlorate in an aqueous medium in the presence of 0.01% to 0.05% osmium tetroxide, based on the weight of the reaction mixture, at a temperature from about 30° C. to about 80° C., extracting glyceric acid from the reaction mixture with an organic liquid which is a member of the class consisting of water-insoluble aldehydes and ketones, and thereafter separating said glyceric acid and said organic liquid by steam distillation.

2. A process for preparing glyceric acid which comprises reacting acrylic acid and sodium chlorate in an aqueous medium in the presence of 0.01% to 0.5% osmium tetroxide, based on the weight of the reaction mixture, at a temperature from about 40° C. to about 70° C., extracting glyceric acid from the reaction mixture with an organic liquid which is a member of the class consisting of water-insoluble aldehydes and ketones, and thereafter separating said glyceric acid and said organic liquid by steam distillation.

3. The process of claim 2 in which the organic liquid is cyclohexanone.

References Cited in the file of this patent

UNITED STATES PATENTS

| | | |
|---|---|---|
| 2,033,538 | Ralston et al. | Mar. 10, 1936 |
| 2,390,335 | Sobotka et al. | Dec. 4, 1945 |
| 2,402,566 | Milas | June 25, 1946 |
| 2,414,385 | Milas | Jan. 14, 1947 |
| 2,510,905 | Raczynski | June 6, 1950 |
| 2,613,223 | Young | Oct. 7, 1952 |

OTHER REFERENCES

Melikow: Ber. Deut. Chem., vol. 13, page 273 (1880).
Hofmann et al.: Ber. 46, 1667 (1914).
Milas et al.: J. Am. Chem. Soc., 47, 1412 (1925).
Glattfeld et al.: J. A. C. S., vol. 49, pp. 2309–15, 1927.
Braun: J. A. C. S., vol. 51, pp. 228–48, 1929.
Glattfeld et al.: J. A. C. S., vol. 55, pp. 3663–8, 1933.
Glattfeld, et al.: J. A. C. S., vol. 60, pp. 1384–7, 1938.
Houben: Die Methoden der Org. Chem., vol. 3, p. 101 (1943).
Parkes: Mellor's Modern Inorganic Chem., pp. 297 and 517 (1951).